Figure 6:
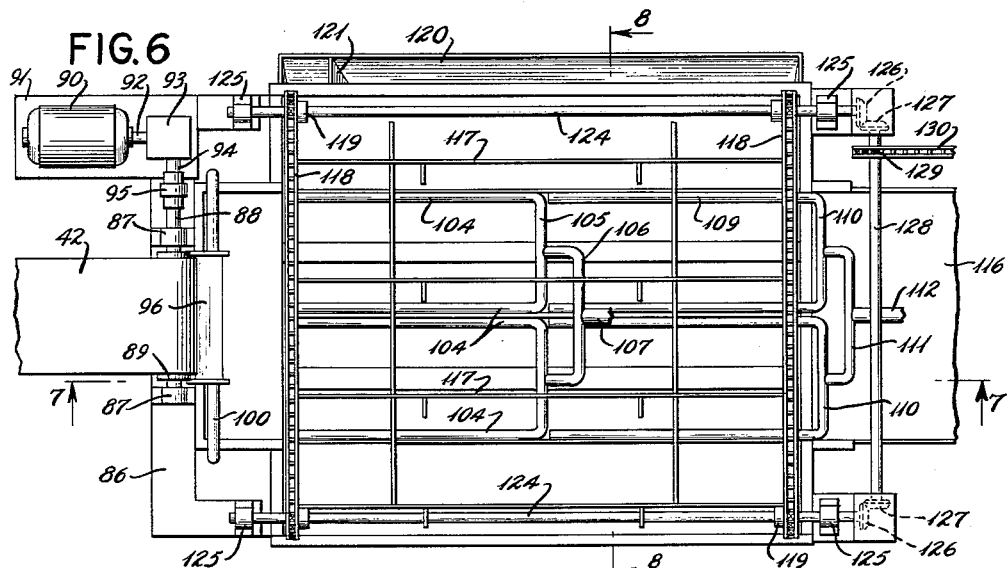

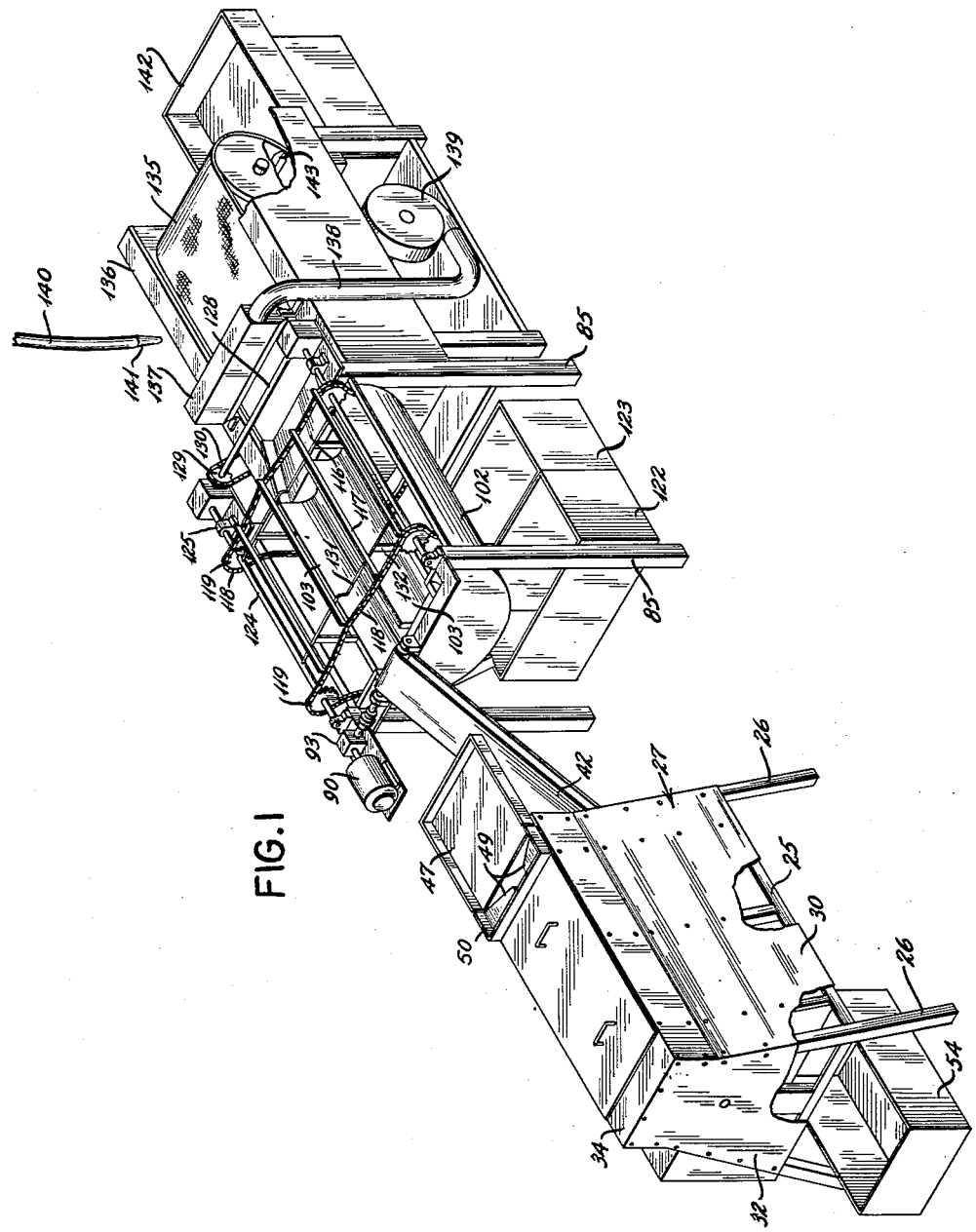

Feb. 18, 1964 W. A. ZARTMAN 3,121,252
APPARATUS FOR SEPARATING MATERIALS
Filed March 2, 1960 3 Sheets-Sheet 2

INVENTOR
W.A. ZARTMAN

INVENTOR
W.A. ZARTMAN

BY
ATTORNEY

United States Patent Office 3,121,252
Patented Feb. 18, 1964

3,121,252
APPARATUS FOR SEPARATING MATERIALS
Willmar A. Zartman, Atlanta, Ga., assignor to Meat Separator Corporation, Atlanta, Ga.
Filed Mar. 2, 1960, Ser. No. 12,300
5 Claims. (Cl. 17—1)

This application relates to the separation of materials including the separation of relatively soft and lightweight material such as meat from heavier and harder substances such as bone, gristle and the like.

The invention relates more particularly to the removal and separation of meat from a poultry carcass, including from all of the bones from which edible meat may be obtained. This includes not only removal from legs, wings and breast bones, but from those parts in which difficulty of removal is encountered, such as the neck and back, and also to the separation of the meat from the bones and fragments thereof after removal.

In the processing of poultry it has become a practice to remove the head, feet, feathers and viscera and to market the portions having edible meat in a package, the portions oftentimes being cut up into varying numbers of pieces and in various ways and oftentimes similar pieces such as legs, backs, wings and necks are sold separately.

It has also become the practice to remove meat for packing for sandwich spreads or for use in salads, soups, pastry pies, pureed foods and the like. However, the labor involved in the removal of meat from necks and backs has oftentimes rendered unprofitable the use of necks and backs for such purposes. Furthermore, although a major portion of the meat may be profitably removed manually from other parts of the poultry, it has not been found profitable to remove all of the meat. As a result, a substantial quantity of meat from necks and backs, as well as from other parts, has been wasted.

Various methods of removing meat from neck bones have been employed, including mechanical impact separation such as that described in Patents 2,734,537 and 2,734,540 to H. F. Geisler. However, the meat obtained obtained from such mechanical manipulation has sometimes contained bone fragments and pin bones which are difficult to remove during inspection. One reason is that the pin bones are numerous and tiny and frequently embedded in the meat and, therefore, not readily visible. As a result, it has not been commercially feasible to remove all bone matter from the meat, even after careful inspection. This has limited the market for such meat and caused the cost of handling and inspecting the meat to remain high.

Another method that has been suggested for removing and separating such materials is to break up the pieces into small fragments which are placed in a brine solution whose specific gravity is controlled to permit the bones to sink but to float the meat. This has the disadvantage of soaking the meat in brine, which may affect its flavor, making it less desirable or unsuitable for certain uses. Furthermore, such method has not been entirely successful in the removal of poultry neck pin bones. Another disadvantage is that relatively expensive apparatus is required for the practice of the foregoing method. Furthermore, changing and adjusting the specific gravity of the brine solution within the required narrow limits is difficult and time-consuming.

A further suggested method is to finely comminute the meat and bone and to separate the same in a centrifuge. However, in many products such as meat pies and salads, it is desirable to use larger pieces of meat instead of only that which is finely comminuted. Thus, the market for meat produced by this method is greatly limited. Furthermore, the comminution of meat promotes the loss of its natural juices, thus depriving it of its essential flavor characteristics.

Another drawback of previously known apparatus and methods has been the length of time required for the process. Since the poultry is in a cooked condition, it is desirable to remove the meat immediately following the cooking while the meat is soft. Due to its elevated temperature, however, the opportunity for the growth of bacteria is increased and the fragmentizing of the meat increases the ease with which the growth may extend.

Accordingly, it is an object of the present invention to provide a method and apparatus for removing meat from poultry carcasses and separating such meat from bones and other inedible materials.

A further object is the provision of improved apparatus for efficiently and rapidly removing cooked poultry meat from the carcass and separating the meat from the intermingled inedible substances and at the same time cooling the meat fragments to decrease the growth of bacteria therein.

A further object of the invention is the provision of a novel separator for separating relatively light and heavy materials and in which adjustments of the apparatus to compensate for variable substances and conditions may be easily and promptly made.

A further object of the invention is the provision of an apparatus and method for removing cooked meat from poultry carcasses and separating the meat from inedibles, which is relatively compact and easy to operate and requires only a small number of personnel for relatively large capacity operation.

Figure 7:
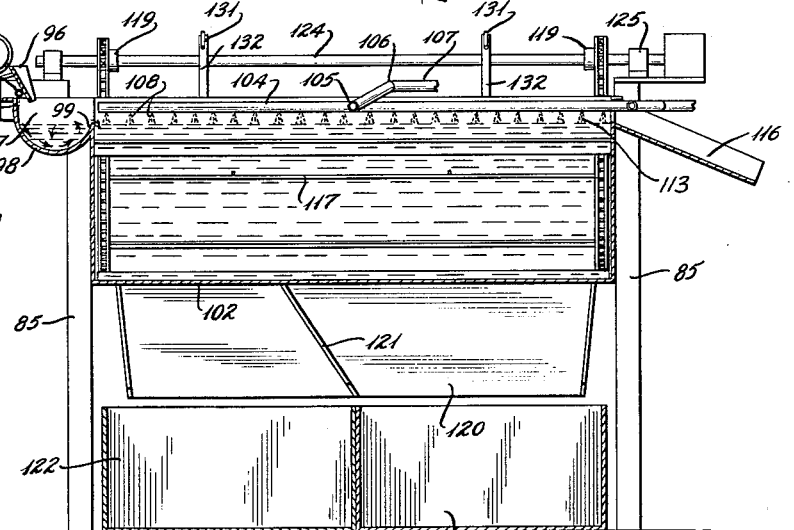

These and other objects of the invention will become apparent from the following description taken in conjunction with the accompanying drawings, wherein:

FIG. 1 is a perspective of apparatus constructed in accordance with the present invention with parts omitted;

FIG. 2, a vertical section to an enlarged scale of the meat removal portion of the apparatus;

FIG. 3, a section on the line 3—3 of FIG. 2;

FIG. 4, a section on the line 4—4 of FIG. 2;

FIG. 5, a fragmentary schematic of the driving means for the apparatus illustrated in FIGS. 2 and 4;

FIG. 6, a top plan view to an enlarged scale of the meat separating portion of the apparatus of FIG. 1;

FIG. 7, a section on the line 7—7 of FIG. 6; and

Figure 8:
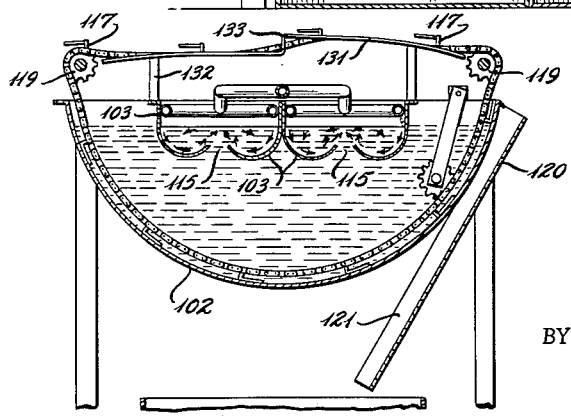

FIG. 8, a section on the line 8—8 of FIG. 6.

Briefly stated, the invention comprises a novel meat remover of the impact type which removes edible meat from the bones of poultry and separates the large bones, and a separating apparatus for separating the meat from small bones and any bone fragments. In the meat remover, poultry is introduced into an impact cage which is mounted for oscillation a substantial distance from the axis of rotation. By rapidly oscillating the cage, the poultry is repeatedly slammed against the sides thereof resulting in removal of the meat and its discharge from the side of the cage while retaining the larger bones for separate disposal at an end of the cage. The cage is mounted within a trough having inclined walls and an opening therebeneath for the passage of material escaping from the cage. The materials passing through such opening are deposited on an inclined endless conveyor which carries them to a bone separating apparatus.

The separating apparatus includes a trough containing water and into which the materials are received and agitated to promote their initial separation into discrete particles. Such particles overflow into a reservoir portion of the separator having one or more pairs of spaced aligned troughs arranged axially of the reservoir portion and submerged just beneath the surface. Rotary or twisting motion of liquid and materials within such troughs is caused by the discharge of water under pressure against the sides of the troughs from above. Due to the high specific gravity of the bone portions, such portions tend to sink or move to the outer reaches of the mixture within the troughs and be deposited in an area of relatively still water intermediate the pair of troughs from which they will sink to the bottom of the reservoir. The reservoir preferably has a rounded bottom and a plurality of scrapers are provided for removing the sunken materials therefrom.

The meat which traverses the reservoir portion of the separating apparatus overflows onto an endless foraminous belt which permits the drainage of water and affords inspectors beside the belt the opportunity to remove any inedibles.

The entire operation of removing the meat from the bones and the separation of the meat therefrom is performed in ten seconds, thereby providing a high output rate and minimizing the opportunity for contamination and the growth of bacteria.

With continued reference to the drawings, the present invention includes a meat remover of the impact type having a screening cage 10 comprising spaced angular downwardly converging end supports 11 mounted in a collar 12 fixed on a shaft 13. The end supports 11 are provided in their upper portions with a plurality of equally spaced holes 14 which receive parallel rods 15, the spacing between such rods being of a size to permit pieces of the meat to pass therethrough but restraining large pieces of bone. In order to maintain the center portion of the bars 15 in spaced relation, the cage is provided with one or more pairs of intermediate supports 16 having their lower ends connected by fasteners 17 to a connecting link 18. An arcuate imperforate plate 19 connects the two lowermost bars 15 and forms a bottom for the cage, and a similar arcuate imperforate plate 20 connects the uppermost bars and forms a top for the cage.

The cage is located within a main frame 25 having legs 26, the frame supporting a housing 27. The ends of frame 25 have bearings 28 mounted therein which receive shaft 13.

The housing 27 includes sides 30 and 31, ends 32 and 33 and a top 34. An elongated trough is disposed within the housing 27 and includes transverse end partitions 36 and 37 and a pair of side partitions 38. The partitions 38 have upper generally parallel portions 39, intermediate downwardly inclined converging portions 40, and lower generally parallel portions 41, the bottom longitudinal edges of which are tapered upwardly from left to right as viewed in FIG. 2. A conveyor belt 42 has its lower portion carried by a roller 43 supported by bearings 44 mounted on the partition 36 at the forward end of the machine. The belt is positioned just beneath the bottom edges of the trough and extends through the rear end 33 of housing 27 to the top of the separator apparatus, to be later described.

The trough is provided with a cover 45 having handles 46 by means of which the cover may be removed for access to the cage 10.

In order to introduce cut-up poultry into the cage 10 a receiving tray 47 supported by braces 48 is mounted on the rear of the housing 27 substantially in alignment with the top 34. The tray is enclosed on three sides with the end adjacent to the housing being open so that pieces of poultry resting thereon can be moved from the tray to an inlet trough 49. Adjacent to the inlet is a flange 50 for directing poultry through the inlet into a chute 51. The chute leads to an opening 52 in the partition 37 through which poultry is discharged into the cage 10. The partition 36 at the opposite end of the machine has an opening 53 through which bones retained in the cage are discharged by gravity after the meat has been separated therefrom. In order to cause the bones to gravitate toward the end of the cage which is adjacent to opening 53, the cage is mounted with such end slightly lower than the opposite inlet end. A container 54 is provided to receive bones discharged from the opening 53.

To reduce the tendency of the meat and other substances to stick to the rods 15 or the partitions 38, and to lubricate the mass, a liquid spray nozzle 56 is mounted centrally of the cage and reveives water or other liquid through a flexible hose 57 from a source of supply, not shown.

In order to oscillate the cage 10, the shaft 13 on which it is mounted is provided with a crank arm 60 at each end thereof. The off-center end of each of the arms 60 is connected by a pivot pin 61 to a link 62. The opposite end of each link is connected by a pivot pin 63 to an off-center position on a flywheel 64. The flywheels 64 are mounted on opposite ends of a shaft 65 so that rotation thereof causes the links 62 to oscillate the arms 60 and the shaft 65.

A sprocket 66 is mounted on the shaft 65 and is driven by a chain 67 from a sprocket 68 mounted on a shaft 69 extending from a gear reduction 70. The gear reduction 70 is driven by a pulley 71 and a belt 72 from an adjustable pulley 73 carried by a shaft 74 of a motor 75 mounted on a sliding block 76. Pulley 73 is a conventional split pulley with one-half fixed to the shaft 74 and the other half under the tension of a spring 77 so that adjustment of the motor 75 along the sliding block 76 will cause the belt 72 to open or close the gap between the pulley halves and consequently change the drive ratio.

The cage is preferably oscillated at 150 to 750 impacts per minute, depending on the material being processed, a rate of 550 having been found a suitable average for chicken.

The upper end portion of the conveyor belt 42 is mounted to discharge material into the separator apparatus. The separator apparatus has an end frame 86 mounted on legs 85 and which supports bearings 87 in which the shaft 88 of the conveyor belt roller 89 is journaled. The shaft 88 is driven by a motor 90 mounted on a platform or motor mount 91. The motor has a shaft 92 which drives a reduction gearing 93 which in turn drives a shaft 94 connected to the shaft 88 by a flexible coupling 95.

The material which has been carried upwardly by the conveyor belt 42 is discharged from such belt onto a chute 96 and falls into a transverse trough 97 having a curved recessed bottom 98 which extends upwardly to a ledge 99. Water under pressure is supplied to the trough 97 through a pipe 100 having a plurality of spray jets 101 directed downwardly against the inlet side of the trough 97 above the level of the water in the trough which is substantially at the height of the ledge 99. The water currents created by the water under pressure entering at one side of the trough cause a tumbling or circular rolling motion within the trough to separate and maintain the separation of the material into discrete particles. Water in the trough overflows the ledge 99 and carries the separated particles into a generally semi-circular reservoir or water tank 102 supported by the legs 85.

One or more pairs of opposed, spaced generally J-shaped channels or troughs 103 extend throughout the length of the tank 102. The channels are arranged in a manner that the lower curved portion of an adjacent pair face each other in parallel spaced relation and the vertical portions extend upwardly above the liquid level. Water and particles discharge from the trough 97 into the ends of the J-shaped channels and the spaces therebetween.

A water pipe 104 is provided along each of the upper vertical portions of the channels 103 and such pipes extend to substantially midway of such channels where they are connected by headers 105 and 106 to a water supply line 107. Pipes 104 have a plurality of openings along their bottoms which direct jets of water 108 downwardly against the vertical portion of the channels 103 and slightly above the water line thereof to create a rolling twisting motion as the particles of meat and bone are carried toward the rear of the machine.

The rear portion of the machine has a pipe 109 substantially in alignment with pipes 104 and connected by headers 110 and 111 to a water supply line 112, the pressure in pipes 109 preferably being slightly less than the pressure within the pipes 104. The pipes 109 have a plurality of openings which direct jets of water 113 downwardly to continue the rolling twisting motion of the particles.

The meat, being lighter than the particles of bone, floats more readily and most of the meat is retained within the confines of channels 103. However, a portion of the meat is carried by the circulating motion out of its channel. Most of such meat is carried over by the cross current into the adjacent channel, a minor portion sinking in the space therebetween. The heavier bones sink in the channels or are forced by centrifugal action against the curved bottom portions of the channels until they are carried over the free edges thereof whereupon the pieces of bone enter a relatively dead water space 115 located between the spaced channels substantially beneath the surface and from which such bones settle to the bottom of the tank. The lighter meat circulates within the channels and some of it interchanges between adjacent channels until it reaches the end of the tank where it is discharged through a sluice or chute 116.

In order to remove the pieces of bone and a small percentage of meat which has settled to the bottom of the tank, a plurality of scrapers 117 are provided which extend substantially the full length of the tank. These are supported on endless chains 118 driven by sprockets 119 and enter one side of the tank from which they move downwardly in contact with the bottom to scrape bones and any meat up the opposite side of the tank where it is discharged onto an angularly disposed plate 120. The plate has a divider 121 with its upper end located nearer to the inlet of the separator and is inclined downwardly to approximately the center of the plate at its bottom.

Containers 122 and 123 are located beneath the plate 120 to receive material scraped from the bottom of the tank. The majority of the heavier bone portions will be discharged from the channels 103 immediately and will fall within the first 10% of the length of the tank and as the particles progress through the tank less and less bone will be discharged along with some particles of meat. When the scrapers clear the particles which have settled on the bottom of the tank the first portion is almost entirely bone and is therefore discharged into the container 122. The remaining portion, however, contains some particles of meat which can be salvaged by reprocessing through the machine and these particles are discharged into the container 123.

In order to drive the scraper chains 118, sprockets 119 are fixed on shafts 124 journaled in bearings 125 on each end of the machine. At the rear of the machine the shafts 124 are provided with bevel gears 126 which engage bevel gears 127 carried by a shaft 128. The shaft 128 is driven by a sprocket 129 and a chain 130 from a source of power not shown.

After passing the position of discharge adjacent to the plate 120 the chains extend in their upper run across the top of the tank. In order to support the upper run with its scrapers above the level of the tank, a pair of spaced transverse rods 131 are mounted intermediate the ends of the tank on uprights 132 supported in channels 103. The rods are inclined slightly upwardly from the entering side approximately half way across the tank. At such position they have a step 133 and the remainder of the rods extends across to a position adjacent to the sprockets 119 on the opposite side of the tank. The scrapers move across the top of the machine after discharging the material and ride on the rods 131 up an incline until they reach a point midway of the tank where the rods have the step 133 and as the scrapers pass thereover they fall to the lower portion of the rod. The impact of the scraper striking the lower portion of such rod removes any particles left on the scrapers and such particles fall back into the channels 103.

The meat which leaves the separator apparatus through the sluice 116 is deposited on an inspection belt 135 in the form of a flexible screen or foraminous belt carried by frame 136. As the belt advances, the particles of meat and water are subjected to a blast of air from an air header 137 supplied with air under pressure from an air line 138 connected to a blower 139 which is driven by a suitable source of power. The blast of air from the air header 137 removes the water from the particles of meat on the inspection belt and permits inspectors along the sides of the belt to inspect the meat for any undesirable matter such as bone fragments, blood vessels, gristle, skin fragments and the like, and to remove such matter with nozzles 140 connected to a vacuum hose 141 supplied by a conventional source of vacuum.

As the meat which remains on the inspection belt passes over the end thereof, it falls into a collector or container 142 and any meat clinging to the belt will be removed by a blast of air from a second air header 143 located interiorly of the belt 135.

In the operation of the device the pieces of poultry are fed into the impact cage which is oscillated rapidly to throw the material from side to side and knock the meat off of the bone. The meat and small particles of bone pass through the sides of the cage and fall onto a conveyor which carries the particles of meat and fragments of bone to the separator apparatus. Larger bone material is discharged from the end of the cage where it falls into a container for disposal.

The particles of meat and bone which fall onto the conveyor are deposited in a trough subjected to jets of water to separate the particles and are then carried into a plurality of channels. While in such channels the particles are subjected to jets of water and the lighter meat remains in the channels and the heavier bone is washed out and allowed to settle to the bottom of the tank from which it is removed by scrapers. The portions of meat discharge from the separator apparatus onto an inspection belt for removal of undesirable material and are finally discharged into a container.

Since the entire operation requires only about ten seconds the opportunity for the growth of bacteria or contamination is minimized. Furthermore, the meat fragments are cooled during the operation particularly from their reception in the water bath in which they are tumbled within the troughs.

The apparatus is so constructed and arranged that it may be easily and rapidly cleaned without the necessity of shutting down for a lengthy period.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A device for separating small particles of two materials, the specific gravity of one of which is slightly less than that of the other, said separator comprising a trough positioned to receive material, means for discharging liquid into the trough for the flotation and separation of such material into discrete fragments, said trough being positioned to overflow from its other side, a tank mounted with its inlet end contiguous with the overflow side of said trough, one or more pairs of opposed spaced J-shaped channels mounted in the upper part of said tank and with lower portions thereof below the liquid level and extending axially of the tank and transversely of the inlet trough, said channels having contiguous edges spaced sufficiently to permit material passing over the edge of one channel to sink without engaging the edge of the opposite channel, said channels being spaced sufficiently closely that liquid current from the adjacent channels substantially intersects near the surface, and means for imparting rotary motion to material within said channels, said means comprising means for delivering liquid along the insides of said channels remote from their spaced edges, whereby relatively light meat fragments will be carried in said channels from the inlet to the outlet of the tank and whereby relatively heavy bone fragments will be circulated out of said channels and sink in the space therebetween to the lower part of the tank.

2. Apparatus for separating small particles of two materials, the specific gravity of one of which is slightly less than that of the other, said apparatus including a tank for water in which the materials tend to sink but may be suspended therein by upward currents, said tank having an inlet remotely disposed from its outlet, one or more pairs of opposed spaced J-shaped channels mounted in the upper part of said tank and having lower portions below the liquid level and extending between the inlet and outlet of the tank, the space between the contiguous edges of said channels being sufficient to permit material passing over the edge of one channel to sink without engaging the edge of the opposite channel, said channels being spaced sufficiently closely that liquid current from the adjacent channel substantially intersects near the surface, and means for imparting rotary motion to material within said channels for causing liquid to flow therewithin from the sides of said channels remote from their spaced edges to the sides of the channels adjacent to the spaced edges, whereby relatively light meat fragments will be carried in said channels and in the liquid from the inlet to the outlet of the tank and whereby relatively heavy bone fragments will be circulated out of said channels and sink in the space therebetween to the lower part of the tank.

3. Apparatus for separating materials having slightly different specific gravities comprising a tank for a liquid and having a predetermined liquid level, a trough located across one end of said tank, means for introducing said materials into said trough, means in said trough for separating the materials into discreet particles and for discharging said discreet particles into said tank, said tank having an outlet on the end remote from said trough, one or more pairs of opposed channels located in the upper portion of said tank and having lower portions disposed below the liquid level, said channels extending from said trough to said outlet, the channels of each pair being spaced relatively close together, and means for imparting rotary motion to material within said channels, whereby material having a lighter specific gravity will be moved lengthwise of said channels and discharged through said outlet and material having a heavier specific gravity will be circulated by centrifugal force into the space between said channels and will sink to the lower portion of said tank.

4. Apparatus for separating small particles of two materials having slightly different specific gravities, said apparatus comprising a tank for liquid and having a predetermined liquid level, an inlet for material at one end of said tank, an outlet for material at the opposite end of said tank, one or more pair of J-shaped channels located in the upper portion of said tank and having portions disposed below said liquid level, said channels extending from said material inlet to said material outlet, the channels of each pair being spaced relatively close together and having their shorter legs disposed toward each other, means for introducing material into said channels, and means for imparting rotary motion to the material within said channels whereby material having a lighter specific gravity will be moved lengthwise of said channels and be discharged from said outlet and material having a heavier specific gravity will be circulated by centrifugal force into the space between said channels and will sink by gravity to the lower portion of said tank.

5. The structure of claim 4 including means for separating said materials into relatively small particles comprising a relatively rigid impact cage having spaced openings in its side walls, bearing means mounting said cage for oscillating movement, said bearing means being spaced a substantial radial distance from said cage, and means for oscillating said cage to produce sudden reversal of movement thereof about said bearing means.

References Cited in the file of this patent
UNITED STATES PATENTS

| | | |
|---|---|---|
| 2,600,867 | Gerritsen | June 17, 1952 |
| 2,734,537 | Geisler | Feb. 14, 1956 |
| 2,827,383 | Gorton | Mar. 18, 1958 |
| 2,858,222 | Harris et al. | Oct. 28, 1958 |
| 2,895,162 | Harris | July 21, 1959 |
| 2,932,058 | Childers | Apr. 12, 1960 |
| 2,945,589 | Olney | July 19, 1960 |